(12) United States Patent
Jinqiang et al.

(10) Patent No.: US 11,029,473 B2
(45) Date of Patent: Jun. 8, 2021

(54) FIBER OPTIC CONNECTOR

(71) Applicant: Tyco Electronics (Shanghai) Co. Ltd., Shanghai (CN)

(72) Inventors: Zhang Jinqiang, Shanghai (CN); Zhao Liqi, Shanghai (CN); Wu Xifei, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/002,559

(22) Filed: Jan. 21, 2016

(65) Prior Publication Data

US 2016/0209603 A1  Jul. 21, 2016

(30) Foreign Application Priority Data

Jan. 21, 2015  (CN) .......................... 201520042724.2

(51) Int. Cl.
*G02B 6/38* (2006.01)

(52) U.S. Cl.
CPC .................................. *G02B 6/3887* (2013.01)

(58) Field of Classification Search
CPC ... G02B 6/3887; G02B 6/3869; G02B 6/4248
See application file for complete search history.

(56) References Cited

U.S. PATENT DOCUMENTS

| 5,425,120 A * | 6/1995 | Peterson | G02B 6/4478 385/104 |
|---|---|---|---|
| 6,134,370 A * | 10/2000 | Childers | G02B 6/4478 174/74 R |
| 6,523,352 B1 * | 2/2003 | Takahashi | F01D 9/023 138/103 |
| 6,554,489 B2 * | 4/2003 | Kent | G02B 6/3829 385/135 |
| 6,629,783 B2 * | 10/2003 | Ngo | G02B 6/4478 385/76 |
| 6,634,801 B1 * | 10/2003 | Waldron | G02B 6/3887 385/135 |
| 6,695,490 B2 * | 2/2004 | Shirakawa | G02B 6/3829 385/72 |
| 6,695,790 B2 * | 2/2004 | Van Oort | A61B 5/0456 600/508 |
| 6,817,780 B2 * | 11/2004 | Ngo | G02B 6/3887 385/86 |
| 6,959,139 B2 * | 10/2005 | Erwin | G02B 6/4478 385/134 |
| 7,310,472 B2 * | 12/2007 | Haberman | G02B 6/4478 385/100 |

(Continued)

OTHER PUBLICATIONS

TE Connectivity, Fiber Optic Products Catalog, Drawing of LC Connector Components, 1 page, received Apr. 28, 2016.

*Primary Examiner* — Thomas A Hollweg
*Assistant Examiner* — Mary A El-Shammaa
(74) *Attorney, Agent, or Firm* — Barley Snyder

(57) ABSTRACT

A fiber optic connector is provided. The fiber optic connector includes a housing, a ferrule received in the housing, and an arc-shaped tail tube. The arc-shaped tail tube is secured to a rear end of the housing and includes a ring end portion and a main body. The ring end portion is connected to the rear end, while the main body extends from the ring end portion away from the housing.

20 Claims, 5 Drawing Sheets

(56) References Cited

U.S. PATENT DOCUMENTS

| | | | | |
|---|---|---|---|---|
| 7,490,997 | B2* | 2/2009 | Verhagen | G02B 6/3887 |
| | | | | 385/78 |
| 7,677,812 | B2* | 3/2010 | Castagna | G02B 6/4478 |
| | | | | 385/69 |
| 8,408,811 | B2* | 4/2013 | de Jong | G02B 6/3846 |
| | | | | 385/69 |
| 2005/0135755 | A1* | 6/2005 | Kiani | G02B 6/3825 |
| | | | | 385/78 |
| 2008/0025670 | A1* | 1/2008 | Castagna | G02B 6/4478 |
| | | | | 385/69 |
| 2012/0269485 | A1* | 10/2012 | Haley | G02B 6/3887 |
| | | | | 385/78 |
| 2013/0343706 | A1* | 12/2013 | Droesbeke | G02B 6/4478 |
| | | | | 385/76 |
| 2015/0205051 | A1* | 7/2015 | Lei | G02B 6/3887 |
| | | | | 385/77 |

* cited by examiner

FIBER OPTIC CONNECTOR

CROSS-REFERENCE TO RELATED APPLICATION

This application claims the benefit of the filing date under 35 U.S.C. § 119 (a)-(d) of Chinese Patent Application No. CN201520042724.2 filed on Jan. 21, 2015.

FIELD OF THE INVENTION

The present invention relates to a connector and, more particularly, to a fiber optic connector.

BACKGROUND

As the space inside a communication device becomes smaller and smaller, it is necessary to reduce a total length of a fiber optic connector that is mounted inside the communication device. However, in prior art, the total length of a LC-type fiber optic connector generally is about 58.5 mm, and generally has a right angle tail tube with a length about 36.5 mm. Since the LC-type fiber optic with the right angle tail tube is too long, it is not adapted to be installed in the narrow inside space of the communication device.

Accordingly, there is a need to develop a fiber optic connector small enough to be installed in the narrow spaces inside the communication device.

SUMMARY

The present invention has been made to overcome or alleviate at least one aspect of the above mentioned disadvantages. Accordingly, a fiber optic connector is provided and includes a housing, a ferrule received in the housing, and an arc-shaped tail tube. The arc-shaped tail tube is secured to a rear end of the housing and includes a ring end portion and a main body. The ring end portion is connected to the rear end, while the main body extends from the ring end portion away from the housing.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENT(S)

Figure 1:
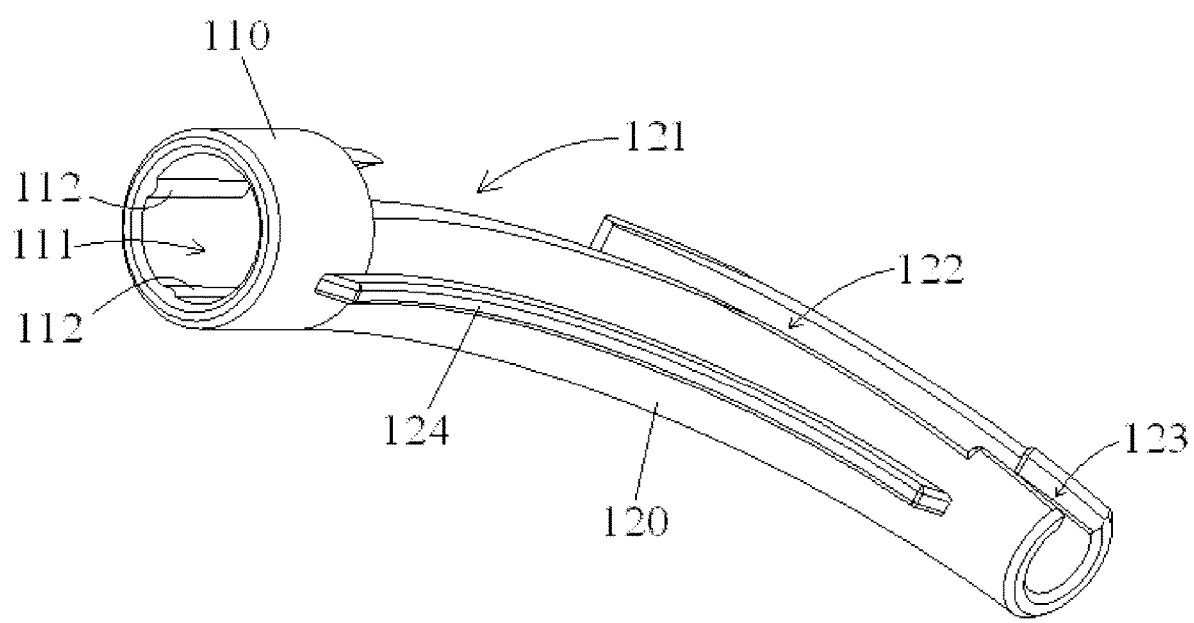
FIG. 1 is a perspective view of a tail tube for a fiber optic connector according to the invention.
Figure 2:
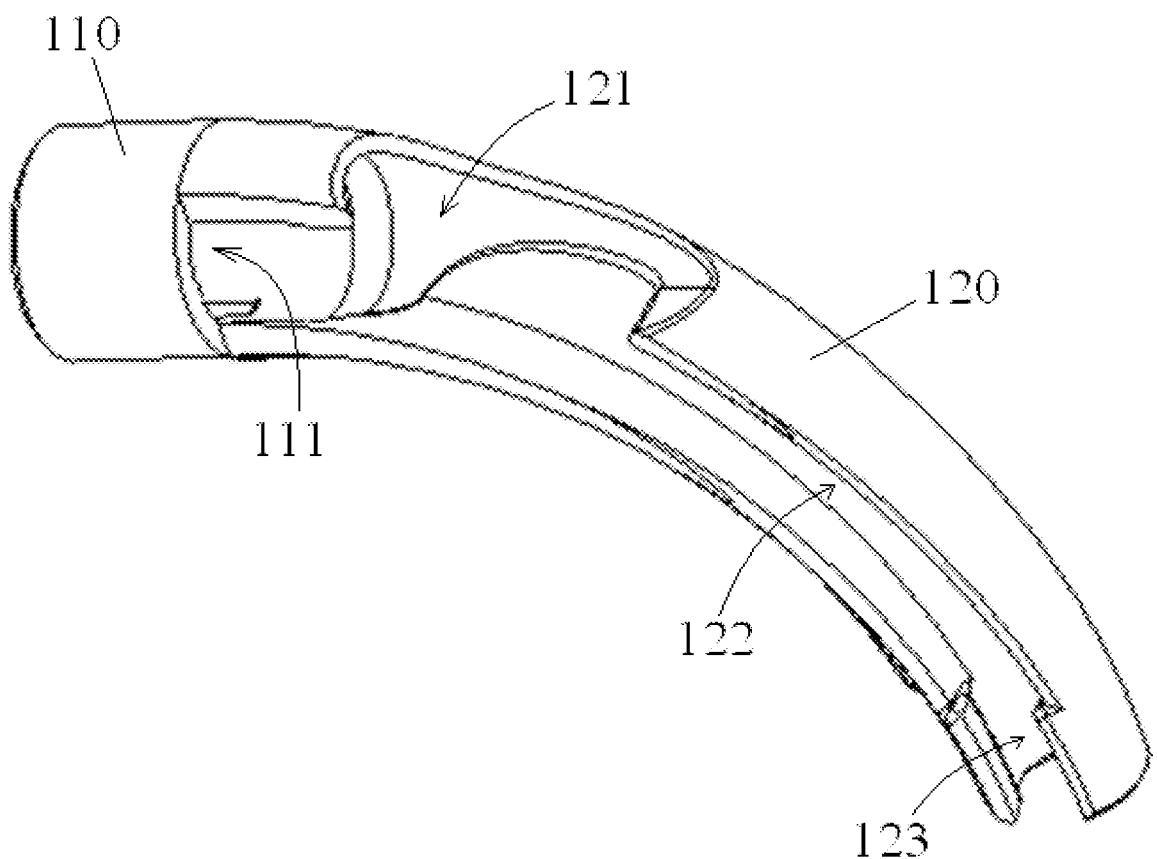
FIG. 2 is another perspective view of the tail tube of the fiber optic connector of FIG. 1.
Figure 3:
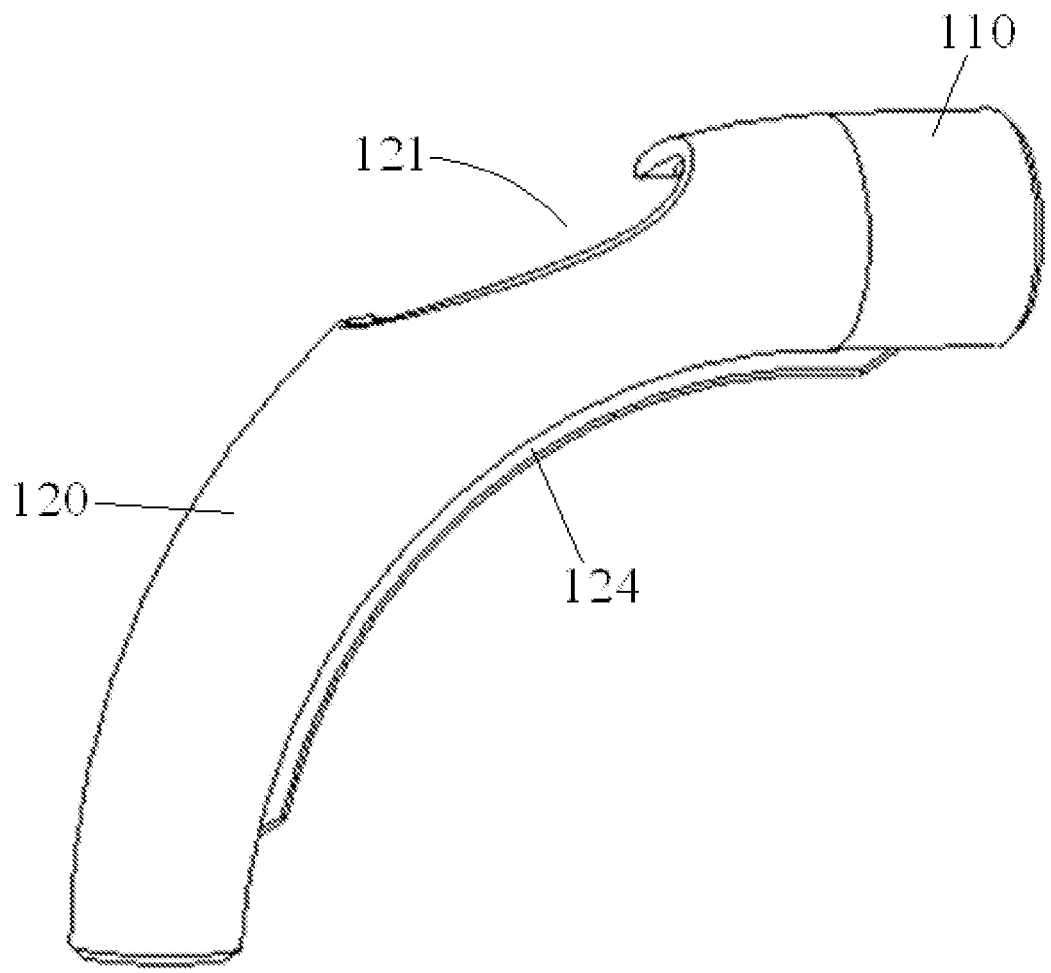
FIG. 3 is another perspective view of the tail tube of the fiber optic connector of FIG. 1.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 5:
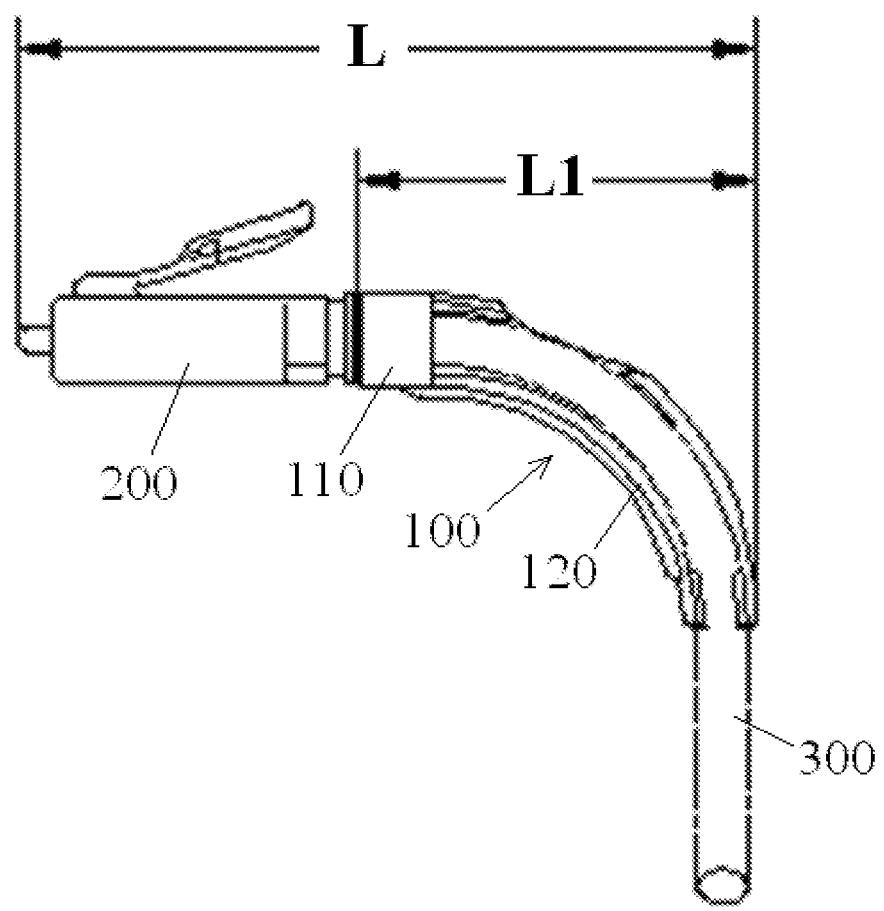
FIG. 5 is another perspective view of the fiber optic connector according to the invention, showing the optical cable extending along an arc path of the tail tube.

According to a general concept of the invention, and shown in FIG. 5, the fiber optic connector generally includes a housing 200, a ferrule (not shown) and a tail tube 100. The ferrule is received in the housing 200. The tail tube 100 is mounted to a rear end of the housing 200.

As shown in FIG. 5, the fiber optic connector is configured to have a total length L less than 50 mm in an axis direction of the ferrule.

In another embodiment, the total length L of the fiber optic connector may be less than 40 mm.

In another embodiment, the total length L of the fiber optic connector may be about 36.6 mm. In this case, the total length L1 of the tail tube 100 in the axial direction of the ferrule may be about 17 mm.

The tail tube 100 is arc curved shaped. In the embodiment shown, the tail tube 100 is curved to have an arc angle of 80~90 degrees, for example, about 90 degrees.

As shown in FIGS. 1-3 and 5, the tail tube 100 generally includes a closed ring end portion 110 corresponding and attaching to a rear end of the housing 200. The tail tube 100 further includes a main body 120 extending from the ring end portion 110 and extending along an arc path.

As shown in FIGS. 1-4, a cable receiving passageway 121 is formed in a proximal end of the main body 120 adjacent to the ring end portion 110. The cable receiving passageway 121 is communicated with an inner bore 111 of the ring end portion 110 in an extending direction of the ferrule. In this way, as clearly shown in FIG. 4, an optical cable 300 connected to the fiber optic connector is capable of passing through the cable receiving passageway 121 along a straight line path without being restricted by the tail tube 100.

As shown in FIG. 5, the optical cable 300 is bent about 80~90 degrees, for example, about 90 degrees, under the restriction of the tail tube 100.

As shown in FIGS. 1-3 and 5, a groove 122 with a U-type cross section is formed in the main body 120 of the tail tube 100 and extends along an arc path with a uniform bending radius larger than an allowed minimum bending radius of an optical fiber. As clearly shown in FIG. 5, an optical cable 300 connected to the fiber optic connector is capable of being received in the groove 122 of the tail tube 100 and extending along the arc path defined by the groove 122. The groove 122 opens substantially perpendicular to the arc path. In this way, after being connected to the fiber optic connector through the cable receiving passageway 121 along the straight line path without being restricted by the tail tube 100, the optical cable 300 may be bent and pushed into the groove 122. As a result, the optical cable 300 is blocked by a sidewall of the groove 122 and cannot be disengaged from the groove 122.

As shown in FIG. 1, a plurality of protrusions 112 are provided along an inner wall of the ring end portion 110, so as to enhance engagement of the ring end portion 110 to the housing 200. The protrusion 112 may have a cross section exhibiting a semi circular, semi elliptical, triangular, or any other suitable shape. In the shown embodiment, each protrusion 112 is an elongated strip.

As shown in FIG. 1, a reinforcement rib 124 is provided on a side of the tail tube 100 opposite to the cable receiving passageway 121.

Referring to FIGS. 1-3 and 5, a slot 123 with a C-type cross section is provided along a distal end of the main body 120, away from the ring end portion 110. The slot 123 communicates with the groove 122 and is adapted to secure the optical cable 300.

As shown in FIG. 5, the groove 122 has an opening with a size larger than an outer diameter of the optical cable 300. In this way, the optical cable 300 may be easily placed into the groove 122. The slot 123 has an opening with a size less than the outer diameter of the optical cable 300. In this way, the optical cable 300 may be reliably secured in the slot 123, preventing the optical cable 300 from disengagement or movement from the groove 122 of the tail tube 100. As a result, the optical cable 300 may be reliably held in the tail tube 100. After the optical cable 300 is reliably held in the tail tube 100, the tail tube 100 may protect the optical cable 300 from a lateral pulling force.

Figure 4:
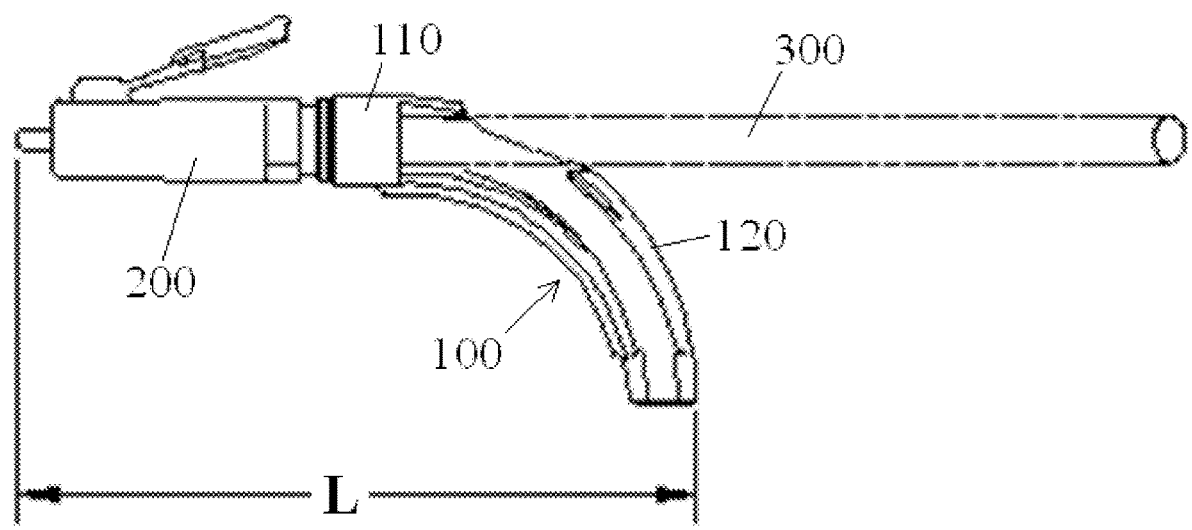
FIG. 4 is another perspective view of the fiber optic connector of FIG. 1, showing an optical cable extending from the tail tube.

As shown in FIGS. 4-5, the fiber optic connector may be LC-type connector. However, the invention is not limited to this, and one skilled in the art would appreciate that the fiber optic connector may be SC-type connector, FC-type connector, or any other type of connector.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber optic connector, comprising:
   a housing;
   a ferrule received in the housing; and
   an arc-shaped tail tube secured to a rear end of the housing and having:
   (a) a ring end portion connected to the rear end of the housing,
   (b) a main body extending from the ring end portion away from the housing,
   (c) a U-shaped groove between walls of the main body and extending along an arc path thereof, an opening of the U-shaped groove extending continuously along the arc path from the ring end portion to a distal end of the main body, and
   (d) a cable receiving passageway positioned at a proximal end of the main body and adjacent to the ring end portion and having an opening in the main body larger than the opening of the U-shaped groove, the opening of the cable receiving passageway extending through the walls of the main body and centered at a position radially offset from a center of the opening of the U-shaped groove with respect to a central axis of the arc-shaped tail tube.

2. A fiber optic connector according to claim 1, further including a protrusion on an inner wall of the ring end portion.

3. A fiber optic connector according to claim 2, wherein the protrusion is semi-circle shaped.

4. The fiber optic connector according to claim 1, further comprising a reinforcement rib disposed along an exterior surface of the main body and opposite to the cable receiving passageway.

5. The fiber optic connector according to claim 1, wherein an optical cable in a first position extends through the ring end portion and the opening of the cable receiving passageway along a straight line path.

6. The fiber optic connector according to claim 5, wherein the optical cable in a second position extends through the U-shaped groove along the arc path.

7. The fiber optic connector according to claim 1, wherein the cable receiving passageway is in communication with an inner bore of the ring end portion and the opening of the U-shaped groove along a common linear axis extending there through.

8. The fiber optic connector according to claim 6, wherein the U-shaped groove and the opening of the cable receiving passageway are configured such that an optical cable attached to the connector is moveable between the first position and the second position without being detached from the connector.

9. The fiber optic connector according to claim 1, wherein the opening of the cable receiving passageway is continuous with the opening of the U-shaped groove.

10. The fiber optic connector according to claim 1, wherein the U-shaped groove opens substantially perpendicular to the arc path and the cable receiving passageway opening is formed through a radially-outward facing side of the arc-shaped tail tube.

11. The fiber optic connector according to claim 1, wherein the opening of the cable receiving passageway and an inner bore of the ring end portion are defined about a common linear axis such that an optical cable in a first position extends through the opening of the cable receiving passageway and the inner bore along a straight line path.

12. The fiber optic connector according to claim 11, wherein, when viewed in the direction of the straight line path, the opening of the cable receiving passageway defines a generally circular opening complementary to a circular cross-section of an optical cable extending therethrough in the first position.

13. The fiber optic connector according to claim 1, wherein the opening of the cable receiving passageway and an inner bore of the ring end portion are coaxial.

14. The fiber optic connector according to claim 1, wherein the ring end portion defines a closed ring continuous about its circumference.

15. A fiber optic connector, comprising:
a housing;
a ferrule received in the housing; and
an arc-shaped tail tube secured to a rear end of the housing and having:
(a) a ring end portion connected to the rear end of the housing and having a semi-circle shaped protrusion on an inner wall thereof,
(b) a main body extending from the ring end portion away from the housing,
(c) a groove between walls of the main body and extending along an arc path thereof, an opening of the groove centered on a first side of the arc-shaped tail tube and substantially perpendicular to the arc path and extending continuously along the arc path and centered on the first side from the ring end portion to a distal end of the main body, and
(d) a cable receiving passageway positioned at a proximal end of the main body and adjacent to the ring end portion and having an opening in the main body larger than the opening of the groove, the opening of the cable receiving passageway extending through the walls of the main body at a position offset from the opening of the groove and centered on a second radially-outward facing side of the arc-shaped tail tube distinct from the first side.

16. A fiber optic connector according to claim 15, wherein the groove is U-shaped.

17. The fiber optic connector according to claim 15, further comprising a reinforcement rib disposed along an exterior surface of the main body and opposite to the cable receiving passageway.

18. The fiber optic connector according to claim 15, wherein an optical cable in a first position extends through the ring end portion and the opening of the cable receiving passageway along a straight line path.

19. The fiber optic connector according to claim 18, wherein the optical cable in a second position extends through the groove along the arc path.

20. The fiber optic connector according to claim 15, wherein the first side of the arc-shaped tail tube faces in a first radial direction with respect to a central axis of the arc-shaped tail tube, and wherein the second side of the arc-shaped tail tube faces in a second radial direction with respect to a central axis of the arc-shaped tail tube distinct from the first direction.

* * * * *